United States Patent
Niwa

(10) Patent No.: US 9,317,281 B2
(45) Date of Patent: Apr. 19, 2016

(54) INFORMATION PROCESSING APPARATUS, PROGRAM UPDATE METHOD FOR INFORMATION PROCESSING APPARATUS, AND STORAGE MEDIUM

(71) Applicant: CANON KABUSHIKI KAISHA, Tokyo (JP)

(72) Inventor: Koji Niwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/857,379

(22) Filed: Apr. 5, 2013

(65) Prior Publication Data

US 2013/0268924 A1 Oct. 10, 2013

(30) Foreign Application Priority Data

Apr. 9, 2012 (JP) .................................. 2012-088151

(51) Int. Cl.
*G06F 21/57* (2013.01)
*G06F 9/445* (2006.01)

(52) U.S. Cl.
CPC . *G06F 8/665* (2013.01); *G06F 8/65* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

2002/0149784 A1* 10/2002 Levin et al. ..................... 358/1.2
2004/0030877 A1* 2/2004 Frid .................................. 713/1
(Continued)

FOREIGN PATENT DOCUMENTS

JP H03278126 A 12/1991
JP 2004038546 A 2/2004
(Continued)

OTHER PUBLICATIONS

Yamakita et al., Phase-based Reboot: Reusing Operating System Execution Phases for Cheap Reboot-based Recovery, 2011.*

Primary Examiner — Wei Zhen
Assistant Examiner — Zhan Chen
(74) Attorney, Agent, or Firm — Canon U.S.A., Inc., IP Division

(57) ABSTRACT

An information processing apparatus that executes a first program and a second program that cooperates with the first program to perform data processing includes a storage unit configured to store information after executing initialization processing based on the first program, a specification unit, a determination unit, an acquisition unit, an update unit, and a control unit configured to cause, when the information is stored in the storage unit at a restart time after the update unit updates the program, the first program to shift to an executable state without executing initialization processing and to cause, when the information is not stored in the storage unit, the first program to shift to the executable state after information to be associated with the updated program to be generated by the initialization processing is stored in the storage unit.

6 Claims, 3 Drawing Sheets

(56) References Cited

U.S. PATENT DOCUMENTS

| | | | |
|---|---|---|---|
| 2004/0040019 A1* | 2/2004 | Ha | G06F 8/65 717/168 |
| 2004/0145766 A1* | 7/2004 | Sugishita et al. | 358/1.13 |
| 2009/0037904 A1* | 2/2009 | Cohen et al. | 717/175 |
| 2009/0240932 A1* | 9/2009 | Hattori | 713/1 |
| 2009/0307480 A1* | 12/2009 | Katoh | 713/2 |
| 2011/0209134 A1* | 8/2011 | Toda | G06F 8/665 717/170 |
| 2012/0008165 A1* | 1/2012 | Tanaka | G06F 9/4418 358/1.15 |
| 2012/0102477 A1* | 4/2012 | Kim et al. | 717/169 |
| 2012/0144179 A1* | 6/2012 | Iyigun | G06F 9/442 713/2 |

FOREIGN PATENT DOCUMENTS

| | | |
|---|---|---|
| JP | 2005284491 A | 10/2005 |
| JP | 2008-282090 A | 11/2008 |
| JP | 2009-146061 A | 7/2009 |

\* cited by examiner

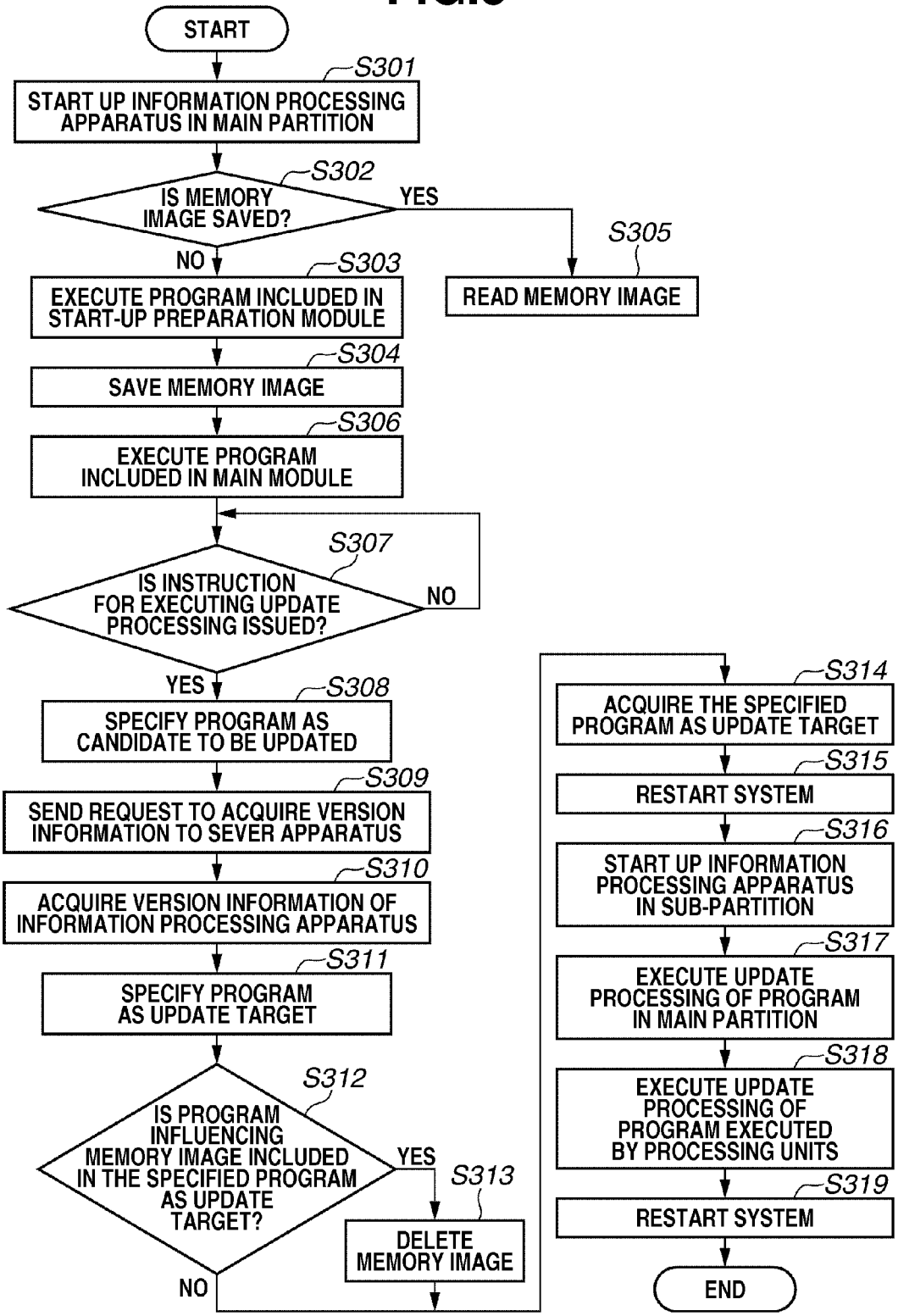

INFORMATION PROCESSING APPARATUS, PROGRAM UPDATE METHOD FOR INFORMATION PROCESSING APPARATUS, AND STORAGE MEDIUM

BACKGROUND OF THE INVENTION

1. Field of the Invention

The present invention relates to an information processing apparatus that performs data processing with firmware updated, a program update method for the information processing apparatus, and a storage medium.

2. Description of the Related Art

With a conventional apparatus or a system, such as a multifunction peripheral (MFP), operating in cooperation with a plurality of information processing apparatuses, firmware update processing is performed as follows. First, in the update processing, the system is to be shutdown. Then, the system is started up in another start-up mode to update firmware, and the firmware of the system or a plurality of devices is updated (refer to, e.g., Japanese Patent Application Laid-Open No. 2008-282090).

The above processing needs to be performed because a running system cannot be updated. Thus, some systems including a plurality of operation systems (OSes), to update firmware (normal start-up firmware), are started up with another firmware (update firmware).

With a method for starting up with a plurality of systems, the number of times the systems need to be restarted is increased. With enlargement of software scale of the system, a time (time to start up system) to complete restart processing tends to become longer. As a result, updating the firmware tends to require a longer time.

As a countermeasure for the longer start-up time, a hibernation technique is now used. With the hibernation technique, information stored in a volatile storage device (memory) of a system at an arbitrary time is saved to a nonvolatile storage device such as a hard disk drive (HDD) or a Universal Serial Bus (USB) memory, and the saved information is written back to the volatile storage device when the system is started up next time. As a consequence, a system state is restored to "a state at the time when the information is saved" (refer to, e.g., Japanese Patent Application Laid-Open No. 2009-146061).

When the hibernation is used in combination with a configuration where the system is divided into a plurality of partitions to update firmware, even if one system is in a hibernation mode, the start-up processing can unexpectedly be performed in another system. If the firmware is updated, and then the information saved before the update is written back to the volatile storage device, the information saved before the update does not correspond to the updated firmware, thereby causing a problem that the start-up processing cannot be performed normally.

In order to prevent such a problem, the system needs to be restored from the hibernation in order to delete the saved information. Then, the entire system needs to be restarted and start-up processing needs to be executed in another system. Therefore, the processing time for updating the firmware cannot be reduced.

SUMMARY OF THE INVENTION

The present invention is directed to an information processing apparatus capable of reducing time required for update processing of a first program and a second program that cooperates with the first program by adapting a state of the first program to a state of the second program according to a system situation.

According to an aspect of the present invention, an information processing apparatus that executes a first program and a second program that cooperates with the first program to perform data processing includes a storage unit configured to store information after executing initialization processing based on the first program, a specification unit configured to specify an update program to be acquired from a server apparatus in response to a program update instruction, a determination unit configured to determine whether the information stored in the storage unit corresponds to information about the first program or second program to be updated based on the specified update program, an acquisition unit configured to acquire, when the determination unit determines correspondence, an update program to be updated, and to acquire, when the determination unit determines non-correspondence, the update program to be updated after deleting the information stored in the storage unit, an update unit configured to update the first program or second program based on the update program acquired by the acquisition unit, and a control unit configured to cause, when the information is stored in the storage unit at a restart time after the update unit updates the program, the first program to shift to an executable state without executing the initialization processing, and to cause, when the information is not stored in the storage unit, the first program to shift to the executable state after information to be associated with the updated program to be generated by the initialization processing is stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a flowchart of a control method for the information processing apparatus according to the present exemplary embodiment.

DESCRIPTION OF THE EMBODIMENTS

Various exemplary embodiments, features, and aspects of the invention will be described in detail below with reference to the drawings.

<Description of System Configuration>

Figure 1:
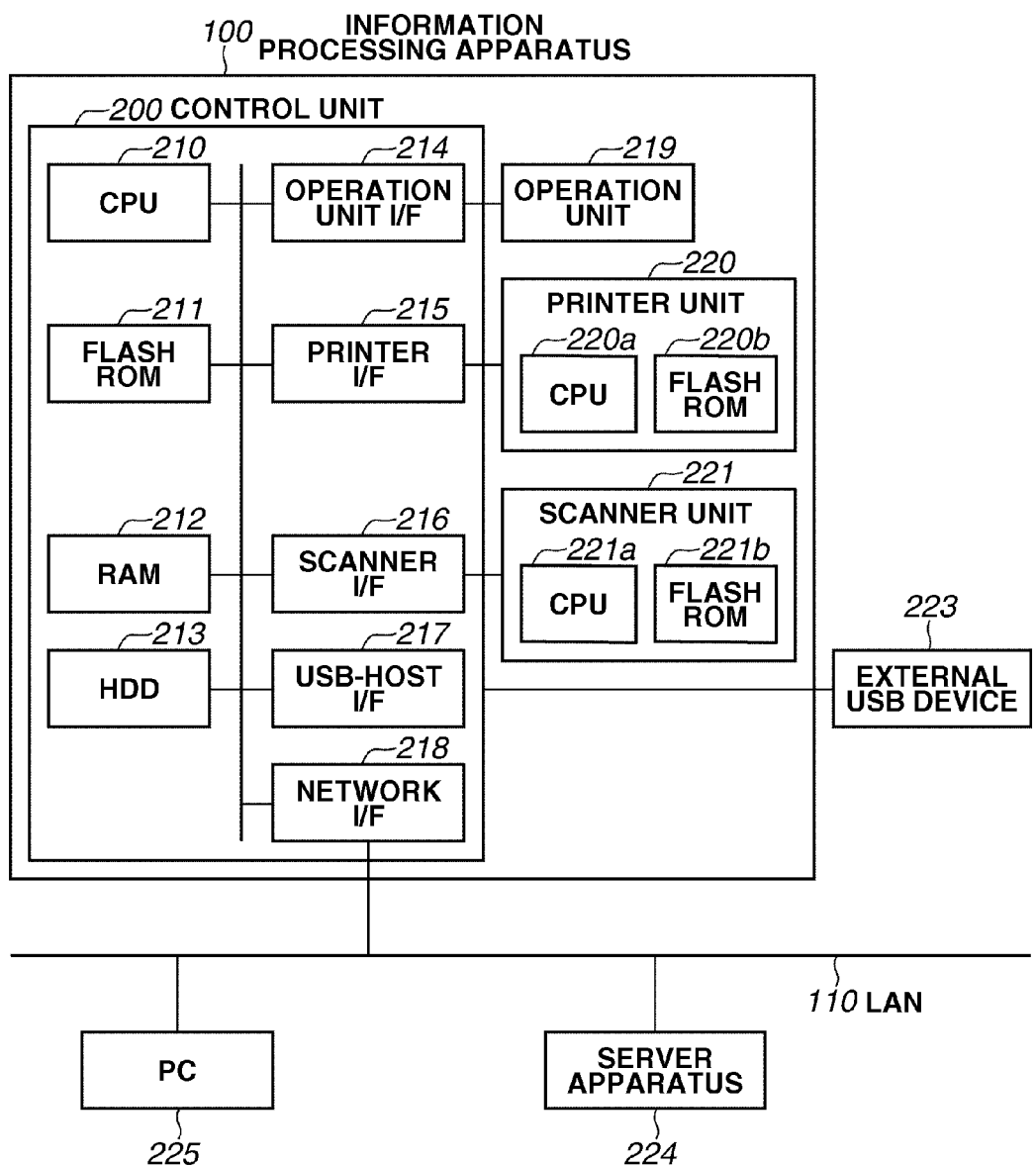
FIG. 1 illustrates an example of a block diagram of a configuration of an information processing apparatus according to an exemplary embodiment of the present invention.

FIG. 1 illustrates an example of a block diagram of a configuration of an information processing apparatus 100 according to an exemplary embodiment of the present invention. According to the present exemplary embodiment, as an example of the information processing apparatus 100, a multifunction peripheral (MFP) is used. Alternatively, a printer apparatus or a facsimile machine may be used. Referring to FIG. 1, a control unit 200 entirely controls the information processing apparatus 100. The control unit 200 includes the following components as a configuration for controlling the information processing apparatus 100.

A central processing unit (CPU) 210 reads a program (first program) for the control unit 200 stored in a flash read only memory (ROM) 211 to a random access memory (RAM) 212, and executes the program.

A hard disk drive (HDD) 213 stores print data received from a personal computer (PC) 225 via a network interface (I/F) 218. The program executed by the CPU 210 includes a print application program.

Under the print application program, the print data stored in the HDD 213 is converted into image data printable by a print unit 220. The HDD 213 also stores the image data printable by the print unit 220.

The program executed by the CPU 210 includes a scan application program. Under the scan application program, a scanner unit 221 reads the image data, and transfers the read image data to the HDD 213. The HDD 213 stores the read image data. According to the present exemplary embodiment, the flash ROM 211 or the HDD 213 is used as a unit that stores information provided for high-speed start-up (hibernation). A semiconductor memory of a flash solid state drive (SSD) may be used as a storage unit. According to the present exemplary embodiment, the information processing apparatus 100 includes a hibernation mode for power saving control. After turning on power, information after executing initialization processing is stored in the storage unit, and start-up processing is performed based on the information stored in the storage unit when a start-up request is made afterward. Since Japanese Patent Application Laid-Open No. 2009-146061 discusses the technique of the hibernation mode processing, in the present exemplary embodiment, the detailed description is omitted.

An operation unit interface (I/F) 214 is to send an instruction input by an operator of the information processing apparatus 100 via an operation unit 219 to the CPU 210. The operation unit I/F 214 is to receive, from the CPU 210, a signal to switch contents to be displayed on the operation unit 219 to send it to the operation unit 219.

A printer I/F 215 connects the control unit 200 to the print unit 220. The print unit 220 prints data on a sheet via the printer I/F 215 based on the image data transferred from the HDD 213. The print unit 220 includes a central processing unit (CPU) 220a and a flash ROM 220b. The CPU 220a executes a program stored in the flash ROM 220b, thereby enabling the print unit 220 to execute various operations for print processing.

A scanner I/F 216 connects the control unit 200 to the scanner unit 221. The scanner unit 221 (input unit by which the image data is input) reads an image on a document as image data by using a line sensor including a charge coupled device (CCD) sensor.

The scanner unit 221 further transfers the read image data to the HDD 213 via the scanner I/F 216. The image data that is transferred and stored to the HDD 213 can be printed by the print unit 220. The image data read by the scanner unit 221 is printed by the print unit 220, thereby enabling copy processing.

The scanner unit 221 includes a CPU 221a and a flash read only memory (ROM) 221b. The CPU 221a executes a program stored in the flash ROM 221b, thereby enabling the scanner unit 221 to execute various processing for scan processing.

A USB-host I/F 217 can be connected to an external USB device 223. The external USB device 223 includes, for example, a USB memory or a USB keyboard. A program (update information) may be stored to the USB memory and be downloaded to be stored to a file storage area of the flash ROM 211.

The network I/F 218 connects the control unit 200 to a local area network (LAN) 110, thereby communicating data with the PC 225 or a server apparatus 224 on the LAN 110. The server apparatus 224 stores update information for updating various programs (executed by the information processing apparatus 100), and sends the update information to the information processing apparatus 100 in response to a request from the information processing apparatus 100.

Figure 2:
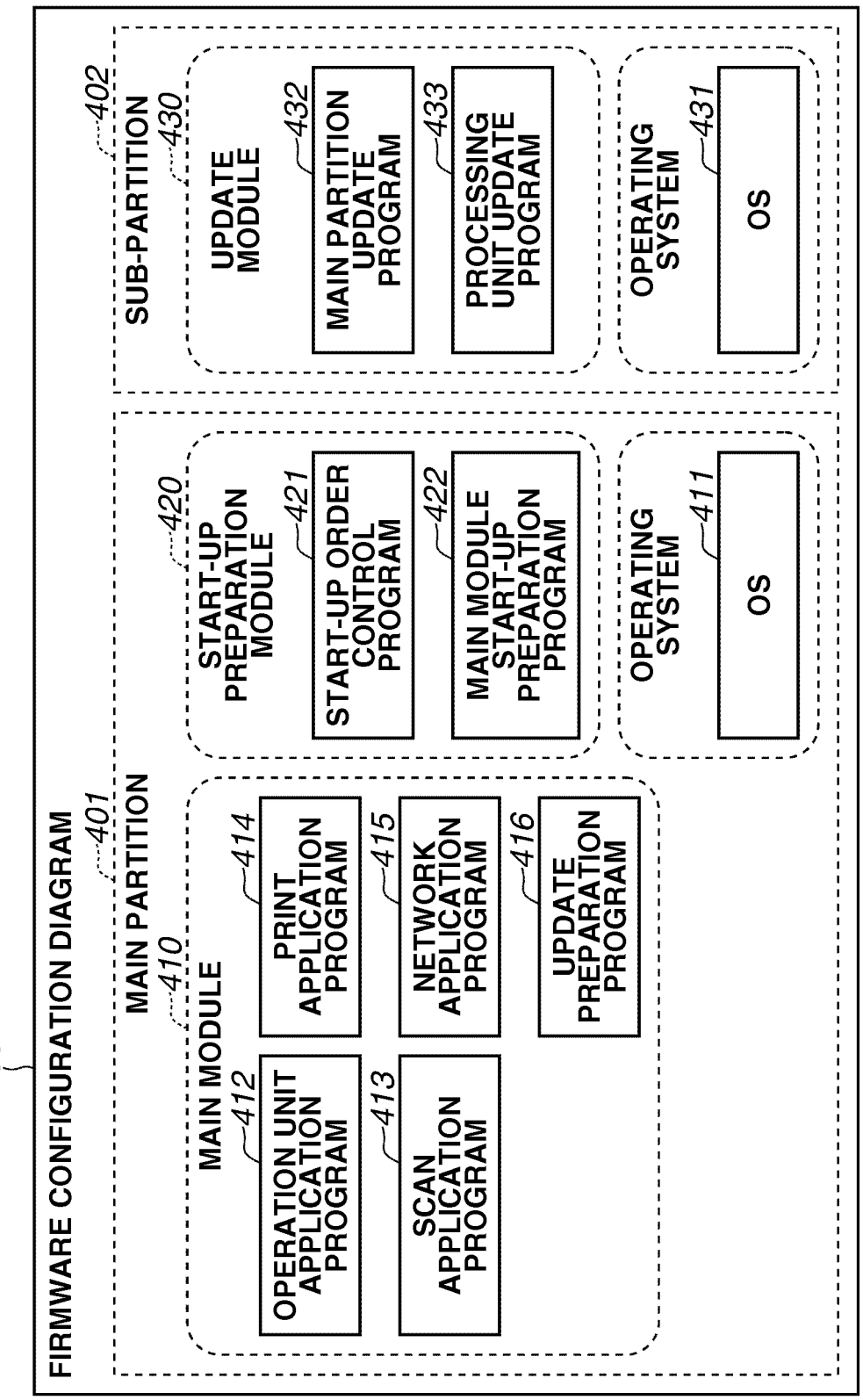
FIG. 2 illustrates a block diagram of a firmware configuration of the image processing apparatus illustrated in FIG. 1.

A description is given of a configuration of a program executed by the CPU 210 (a first control unit) of the control unit 200 with reference to FIG. 2.

FIG. 2 illustrates a block diagram of a firmware configuration of the image processing apparatus 100 illustrated in FIG. 1. A program illustrated in FIG. 2 is stored in the flash ROM 211 illustrated in FIG. 1. According to the present exemplary embodiment, as a data processing apparatus that executes a first program and a second program that cooperates with the first program to perform data processing, the image processing apparatus 100 illustrated in FIG. 1 is used as an example. The second program corresponds to the firmware of the print unit 220 or the scanner unit 221. That is, the second program includes firmware associated with controllers (CPUs 220a and 221a) that perform different data processing operations (scanner processing and print processing).

The program stored in the flash ROM 211 is parted into two partitions on the flash ROM 211, and is stored to the two partitions. One is a main partition 401, and the other is a sub-partition 402.

To cause the information processing apparatus 100 to perform a normal operation, an operating program (hereinafter, referred to as an OS) stored in the main partition 401 is executed by the CPU 210. On the other hand, to cause the information processing to updates a program (for main module 410, a start-up preparation module 420, and an OS 411) that executes the normal operation of the information processing apparatus 100, the OS stored in the sub-partition 402 is executed by the CPU 210.

The main partition 401 includes program modules of the OS 411, the main module 410, and the start-up preparation module 420. The OS 411 controls the information processing apparatus 100, and includes a driver program for controlling operations of the information processing apparatus 100 including the print unit 220 and the scanner unit 221.

The sub-partition 402 includes two program modules of an OS 431 and an update module 430. The OS 431 controls the information processing apparatus 100, similar to the OS 411.

A description is given of the main module 410 in the main partition 401 and program modules included in the start-up preparation module 420. The program modules include application programs executed via the OS 411 by the CPU 210 after the OS 411 starts up.

An operation application program 412 included in the main module 410 sends an instruction input by an operator of the information processing apparatus 100 via the operation unit 219 to the CPU 210, and executes processing in response to the sent instruction.

A scan application program 413 controls the scan processing by the scanner unit 221. A print application program 414 controls the print processing by the print unit 220.

A network application program 415 is used for communication with the PC 225 or the server apparatus 224 on the LAN 110. An update preparation program 416 is used for executing a preparation operation to update the firmware by the information processing apparatus 100 operating in a normal start-up mode.

The start-up preparation module 420 is executed before the CPU 210 executes the main module 410. A start-up order control program 421 included in the start-up preparation module 420 controls program start-up order. The start-up order control program 421 is executed after the start-up of the OS 411 by the CPU 210. A main module start-up preparation program 422 is executed for controlling the start-up order to save a memory image to the flash ROM 211 or the HDD 213 and then execute the main module 410.

The main module start-up preparation program 422 included in the start-up preparation module 420 performs initialization processing required to execute the main module 410 by the CPU 210.

A description is given of program modules included in the update module 430 in the sub-partition 402.

The program module includes application programs executed via the OS 431 by the CPU 210 after the OS 431 starts up.

A main partition update program 432 updates programs of the main module 410, the start-up preparation module 420, and the OS 411 included in the main partition 401.

A processing unit update program 433 updates a program for executing the print processing included in the flash ROM 220b and also executing the scan processing included in the flash ROM 221b. The modules may contain sub-module groups, which include smaller modules. The processing unit update program 433 updates a first program or a second program by an update program obtained from the server apparatus 224. The update program contains a patch-type program.

A description is given of update processing of the programs according to the present exemplary embodiment with reference to FIG. 3.

FIG. 3 illustrates a flowchart of a control method for the information processing apparatus 100 according to the present exemplary embodiment. Processing in steps illustrated in FIG. 3 is performed by executing the program stored in the flash ROM 211 by the CPU 210 of the control unit 200. There is provided a description about control performed when information is stored in the flash ROM 211 at a restart time after the program is updated. At this time, the CPU 210 causes the first program to shift to an executable state without executing the initialization processing. Further, there is provided a description about control performed when the information is not stored in the flash ROM 211. At this time, the CPU 210 stores information to be associated with the updated program generated in the initialization processing to the flash ROM 211, and then the CPU 210 causes the first program to shift to the executable state.

In step S301, the CPU 210 starts up the information processing apparatus 100 in the main partition 401 of the flash ROM 211. Specifically, the CPU 210 starts up the OS 431, and executes the program modules included in the main module 410 and the started-up preparation module 420 via the started-up OS 431.

In step S302, the CPU 210 determines whether information (memory image) in the RAM 212 at the time when the execution of the start-up preparation module 420 is completed is saved to the flash ROM 211 or the HDD 213. If the CPU 210 determines that the information is not saved (NO in step S302), the processing advances to step S303. If the CPU 210 determines that the information is saved (YES in step S302), the processing advances to step S305.

In step S303, the CPU 210 executes the program included in the start-up preparation module 420 via the OS 431.

In step S304, the CPU 210 saves information in the RAM 212 at the time when the execution of the start-up preparation module 420 is completed to the flash ROM 211 or the HDD 213 via the OS 431.

In step S305, the CPU 210 reads the saved information (memory image), writes the read information back to the RAM 212, and restores a system state at the time when the CPU 210 saves the information in the RAM 212, that is, a state in which the execution of the start-up preparation module 420 is completed.

In step S306, the CPU 210 executes the program included in the main module 410 via the OS 431. The CPU 210 executes communication with the print unit 220 via the printer I/F 215 and communication with the scanner unit 221 via the scanner I/F 216.

In step S307, the CPU 210 determines whether an instruction for executing update processing for updating the program of the information processing apparatus 100 is issued. If the CPU 210 determines that the instruction is issued (YES in step S307), the processing advances to step S308. An operator of the information processing apparatus 100, for example, issues the instruction for executing the update processing via the operation unit 219. A schedule may be preset to periodically update the program for each predetermined period (e.g., two weeks), thereby automatically issuing the instruction for periodically executing the update processing.

In step S308, the CPU 210 executes the update preparation program 416 via the OS 411, thereby specifying a program as a candidate to be updated, among the programs stored in the flash ROM 211, the flash ROM 220b, and the flash ROM 221b.

For example, the CPU 210 displays a display screen for designating the program on the operation unit 219, and specifies the program to which the instruction is issued by the operator via the operation unit 219. All programs may be specified as the candidate to be updated, without operator's instruction.

In step S309, the CPU 210 executes the update preparation program 416, and sends a request to acquire device-type ID information for specifying the information processing apparatus 100 and version information to the server apparatus 224 via the network I/F 218. The information processing apparatus 100 acquires the version information managed by the server apparatus 224.

The version information indicates a version of the program module included in the main partition 401. When the server apparatus 224 receives the request to send the device-type ID and the version information from the information processing apparatus 100, the server apparatus 224 specifies the version information corresponding to the device-type ID, and sends the specified version information to the information processing apparatus 100.

In step S310, the CPU 210 executes the update preparation program 416, and acquires the version information of the information processing apparatus 100. The version information of the information processing apparatus 100 means the versions of the programs stored in the flash ROM 211, the flash ROM 220b, and the flash ROM 221b.

In step S311, the CPU 210 executes the update preparation program 416, and specifies a program as an update target. Specifically, the CPU 210 specifies the program whose version information acquired from the server apparatus 224 is different from the version information in the information processing apparatus 100, among the programs specified in step S308 as the candidate to be updated. Thus, the newer version of the program than the version of the program stored in the information processing apparatus 100 can be downloaded from the server apparatus 224.

In step S312, the CPU 210 determines whether a program influencing the information (memory image) saved in step S304 is included in the program as the update target specified in step S311. That is, in step S312, the CPU 210 determines whether the program of the start-up preparation module 420 or the OS 411 is included in the specified program as the update target. If the CPU 210 determines that the program of the start-up preparation module 420 or the OS 411 is included in the specified program as the update target (YES in step S312), the processing advances to step S313. If the CPU 210 determines that the program of the start-up preparation module 420 or the OS 411 is not included in the specified program as the update target (NO in step S312), the saved information (memory image) is held and the processing advances to step S314.

In step S313, the CPU 210 deletes the information (memory image) saved in step S304. By deleting the saved information (memory image), the use of the saved information that causes the mismatch is prevented at the start-up time with the updated firmware.

In step S314, the CPU 210 acquires the program (update information) as an update target specified in step S311 from the server apparatus 224. Specifically, the information processing apparatus 100 sends the program specification information indicating the program as the update target specified in step S311 to the server apparatus 224. When receiving the program specification information from the information processing apparatus 100, the server apparatus 224 sends the program corresponding to the program specification information to the information processing apparatus 100. The program as the update target received from the server apparatus 224 is stored to the flash ROM 211 or the HDD 213. In step S315, the CPU 210 restarts up the system. Specifically, if the information is stored to the flash ROM 211, the information is written to the RAM 212 without predetermined initialization processing, thereby starting up the first program in the hibernation mode. If the information is not stored to the flash ROM 211, the predetermined initialization processing is performed and the first program is started up.

In step S316, the CPU 210 controls the information processing apparatus 100 to be started up in the sub-partition 402. Specifically, the CPU 210 enables the OS 431 to be started up, and the started-up OS 431 executes the program modules included in the update module 430.

In step S317, the CPU 210 executes the main partition update program 432, thereby executing update processing of the programs in the main partition 401 by using the program as the update target acquired in step S314.

In step S318, the CPU 210 executes the processing unit update program 433, thereby executing update processing of the program executed by the processing units (print unit 220 and scanner unit 221). In step S319, the CPU 210 restarts up the system.

Thus, the memory image is deleted in step S313, thereby executing fast update processing without a problem where an inappropriate memory image is used after the system is restarted. Furthermore, the firmware is updated with the memory image maintained as much as possible by the determination made in step S312, the memory image can be used after the system is restarted and fast start-up is achieved. As an example of step S312, the determination process can be made by determining whether the package, which is specified by a difference between a plurality of packages relating to the first program or second program to be updated and each package for the first program or second program to be specified by a table, is a package relating to the initialization processing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-088151 filed Apr. 9, 2012, which is hereby incorporated by reference herein in its entirety.

What is claimed is:

1. A printing apparatus capable of starting up in a high-speed start-up mode using a memory image, the printing apparatus comprising:
a memory device;
a processor;
a storing unit;
a first determining unit configured, when the printing apparatus starts up, to determine whether the memory image is stored in the storing unit;
a controlling unit configured, when the first determining unit determines that the memory image is not stored in the storage unit, to control the printing apparatus to start up in a normal start-up mode, and when the first determining unit determines that the memory image is stored in the storing unit, to control the printing apparatus to start up in the high-speed start-up mode, in which the printing apparatus is able to start up at higher speed than in the normal start-up mode, by using the memory image;
a saving unit configured, when start-up in the normal start-up mode is completed, to save the memory image into the storing unit;
an updating unit configured to perform update processing for updating firmware of the printing apparatus; and
a deleting unit configured to delete, when the printing apparatus starts up by the update processing, the memory image, which is necessary for the high-speed start-up mode, stored in the storing unit,
wherein the first determining unit, the control unit, the saving unit, the updating unit and the deleting unit are implemented at least in part by the processor executing at least one program recorded on the memory device.

2. The printing apparatus according to claim 1, further comprising:
a second determining unit configured to determine whether firmware to be updated by the update processing is firmware corresponding to the memory image stored in the storing unit,
wherein, when the printing apparatus starts up by the update processing and when the second determining unit determines that firmware to be updated by the update processing is firmware corresponding to the memory image stored in the storing unit, the deleting unit deletes the memory image stored by the storing unit,
wherein, when the printing apparatus starts up by the update processing and when the second determining unit determines that firmware to be updated by the update processing is not firmware corresponding to the memory image stored in the storing unit, the deleting unit does not delete the memory image stored in the storing unit, and
wherein the second determining unit is implemented by the processor executing at least one program recorded on the memory device.

3. A method for controlling a printing apparatus capable of starting up in a high-speed start-up mode using a memory image, the method comprising:
determining, when the printing apparatus starts up, whether the memory image is stored;
controlling, when determining that the memory image is not stored, the printing apparatus to start up in a normal start-up mode, and when determining that the memory image is stored, controlling the printing apparatus to start up in the high-speed start-up mode, in which the printing apparatus is able to start up at higher speed than in the normal start-up mode, by using the memory image;
saving, when start-up in the normal start-up mode is completed, the memory image;
performing update processing for updating firmware of the printing apparatus; and
deleting, when the printing apparatus starts up by the update processing, the memory image stored, which is necessary for the high-speed start-up mode.

4. A non-transitory computer-readable storage medium storing a program that causes a computer to execute the method for controlling a printing apparatus capable of starting up in a high-speed start-up mode using a memory image, the method comprising:
determining, when the printing apparatus starts up, whether the memory image is stored;
controlling, when determining that the memory image is not stored, the printing apparatus to start up in a normal start-up mode, and when determining that the memory image is stored, controlling the printing apparatus to start up in the high-speed start-up mode, in which the printing apparatus is able to start up at higher speed than in the normal start-up mode, by using the memory image;
saving, when start-up in the normal start-up mode is completed, the memory image;
performing update processing for updating firmware of the printing apparatus; and
deleting, when the printing apparatus starts up by the update processing, the memory image stored, which is necessary for the high-speed start-up mode.

5. The printing apparatus according to claim 1, further comprising a random access memory (RAM), wherein the memory image is information in the RAM.

6. The printing apparatus according to claim 1, wherein the storing unit is a flash read only memory (ROM) or a hard disk drive (HDD).

* * * * *